(12) United States Patent
Tracht

(10) Patent No.: US 7,543,847 B2
(45) Date of Patent: Jun. 9, 2009

(54) VEHICLE SEAT ASSEMBLY WITH AIR BAG SEAM RUPTURING FORCE CONCENTRATOR

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/970,851

(22) Filed: Jan. 8, 2008

(65) Prior Publication Data
US 2008/0224454 A1 Sep. 18, 2008

(30) Foreign Application Priority Data
Mar. 12, 2007 (DE) .................. 10 2007 011 823

(51) Int. Cl.
*B60R 21/16* (2006.01)
(52) U.S. Cl. .................................... 280/730.2
(58) Field of Classification Search ............. 280/730.2, 280/730.1, 728.3
See application file for complete search history.

(56) References Cited

U.S. PATENT DOCUMENTS 5,927,749 A * 7/1999 Homier et al. ........... 280/730.2
5,967,603 A * 10/1999 Genders et al. .......... 297/216.13
6,045,151 A * 4/2000 Wu ......................... 280/728.3
6,095,602 A * 8/2000 Umezawa et al. ........ 297/216.1

FOREIGN PATENT DOCUMENTS

DE 198 48 900 A1 5/1999

OTHER PUBLICATIONS

German Patent Application No. 10 2007 011 823.8-56, Office Action dated Jan. 30, 2008.

* cited by examiner

*Primary Examiner*—Faye M. Fleming
(74) *Attorney, Agent, or Firm*—Brooks Kushman P.C.

(57) ABSTRACT

A vehicle seat assembly 10 with a frame 26, a seat pad, and an air bag assembly housing, an inflator, and a folded air bag that is inflated to unfold and project outwardly from the seat through an air bag release seam 28 when the seam is ruptured. The vehicle seat assembly has a spinnaker-shaped reinforcement panel 56 with a leading nose 49 secured to the release seam 28 and an anchored end edge 52 that is secured to the frame 26 or to a trim cover 18. The spinnaker-shaped reinforcement panel 56 is movable in response to inflation of the air bag with sufficient force to puncture the release seam 28, thereby allowing the tear seam 28 to open and allowing the air bag to pass therethrough.

17 Claims, 2 Drawing Sheets

US 7,543,847 B2

VEHICLE SEAT ASSEMBLY WITH AIR BAG SEAM RUPTURING FORCE CONCENTRATOR

CROSS-REFERENCE TO RELATED APPLICATIONS

This application claims priority to German Application No. 10 2007 011 823.8, filed on Mar. 12, 2007, the disclosure of which is hereby incorporated in its entirety.

BACKGROUND OF THE INVENTION

1. Field of the Invention

The invention relates to a vehicle seat assembly, and in particular, a seat assembly including an air bag. The seat assembly includes a tear seam which upon being ruptured by a force concentrator facilitates egress of the air bag during deployment.

2. Background Art

Vehicles and associated seating systems are designed to protect an occupant from injury after the vehicle sustains a hit having longitudinal and lateral force components. The side air bags offer protection from the adverse consequences of a blow having primarily a lateral component. Such devices may be in the form of a side air curtain disposed in a headliner of the vehicle, or an air bag disposed within a vehicle seat assembly. One limitation of air bags that are located within a seat assembly is that the air bag needs to break through the seating material before it can fully deploy to protect a vehicle occupant. During deployment, such an air bag may encounter foam, or other seat pad materials. It must then break through a seat trim cover in order to escape from the seat assembly. Such encounters may impede or prohibit full, speedy deployment. Another limitation is that the air bag should break through the cover material at a predetermined location to optimize its effectiveness.

Prior vehicle seat assemblies equipped with side air bags and manufacturing methods are disclosed in U.S. Pat. Nos. 5,816,610; 5,860,673; 5,938,232; 5,967,603; 6,003,938; 6,045,151; 6,237,934; 6,299,197 and 6,588,838, for example.

SUMMARY OF THE INVENTION

The invention broadly includes a vehicle seat assembly that in at least one embodiment, has a frame, a seat pad, and a trim cover extending at least partially over the seat pad. The trim cover includes a first (e.g., front) and a second (e.g., side) portion that together form a tear or release seam. In one embodiment, a brace (such as stitching) extends between the first and second portions of the trim cover at the tear seam to releasably secure the portions of the seam.

An air bag assembly is preferably mounted on or associated with the frame at least partially within the trim cover in a spaced relationship from the air bag release seam. In accordance with one embodiment, the air bag assembly has a (rigid or soft) container and a lid that house an inflator and a folded air bag. In some cases, the container may effectively resemble a sack or a bag. Upon inflation, the bag unfolds and ultimately projects outwardly from the seat through the air bag release seam when the seam is in a second, opened position.

Preferably, a spinnaker-shaped or onion-skin shaped reinforcement panel is provided that has a anchored, stationary edge portion that is secured along at least some of its length to the frame by a mounting means, such as one or more mounting studs, (e.g., nuts and bolts) or to a rear trim panel. At the other end of the spinnaker-shaped reinforcement panel is an a leading nose portion that is secured to one or both portions of the release seam of the trim cover. In some embodiments, the spinnaker-shaped reinforcement panel passes around one side of the air bag assembly.

In operation, the leading nose portion of the spinnaker-shaped reinforcement panel exerts a concentrated, directed force upon the release seam in response to inflation of the air bag. When the force exerted is sufficient, the leading nose portion of the panel ruptures the release seam. In this way, the seam opens and progressively unravels or the stitching breaks, thereby allowing the air bag to pass through.

DETAILED DESCRIPTION OF THE PREFERRED EMBODIMENT(S)

Figure 1:
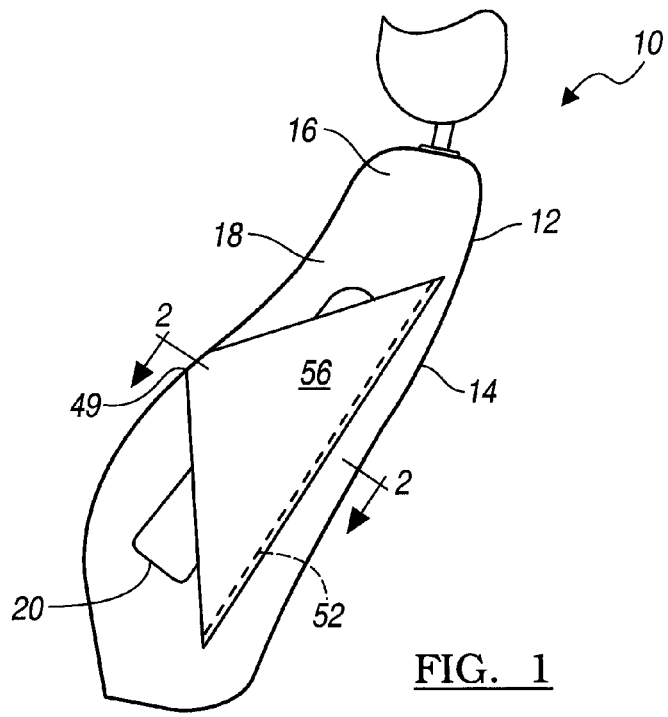
FIG. 1 is a schematic side view of a portion of a seat assembly in accordance with the present invention.

FIG. 1 illustrates one embodiment of a seat assembly 10 that is constructed in accordance with the present invention. The seat assembly 10 includes a seat back 12 and seat pad 16 at least partially covered by a trim cover 18. As is well known, the seat assembly 10 includes a seat cushion or seat bottom (not shown). The trim cover 18 may be made of any suitable material such as cloth, vinyl or leather, etc. In at least some embodiments (e.g. one of which is depicted in FIG. 3), a relatively rigid plastic molding 14 can be provided in the rear area of the seat assembly 10 to provide support and/or for aesthetics.

In at least one embodiment, the seat pad 16 is made from a molded polymeric material, such as a polyurethane foam. The use of a polymeric foam material to construct the seat pad 16 can be cost effective and can provide the flexibility needed to easily change the shape of the seat pad for different types of seat assemblies. Of course, other types of polymeric materials may be molded to form the seat pad 16.

Figure 2:
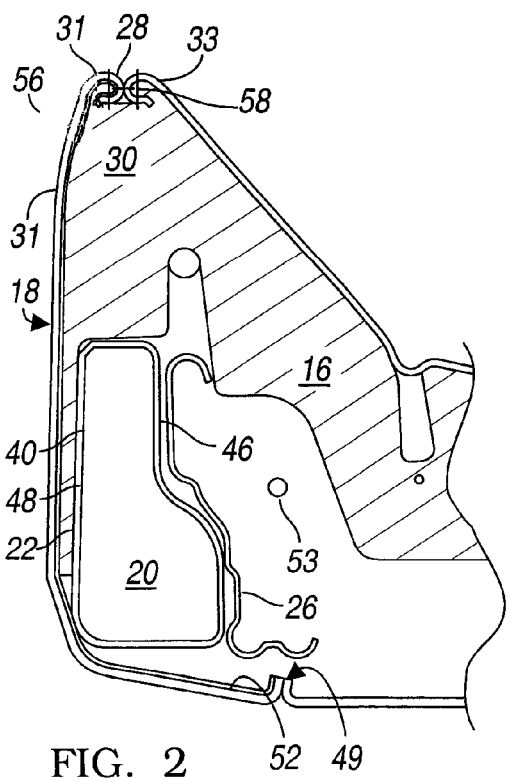
FIG. 2 is a fragmentary sectional view of the seat assembly shown in FIG. 1, taken through line 2-2.
Figure 3:
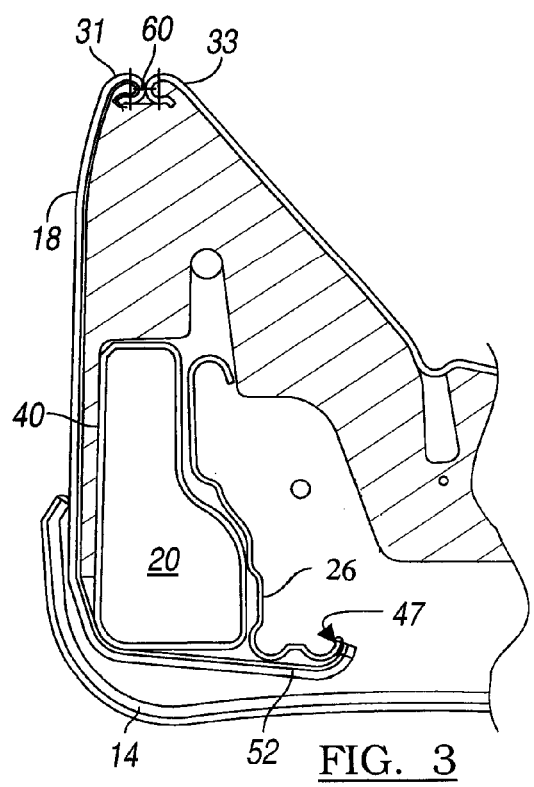
FIG. 3 is an alternate embodiment of the assembly depicted in FIG. 2.

Disposed within the seat back 12 is an air bag assembly, such as a side air bag assembly 20 (FIGS. 2-3). While the side air bag assembly 20 is shown on the seat back 12, which is a usage for which it has particular utility, it is also possible for the side air bag assembly to be utilized with a seat cushion or bottom, even though the seat back usage is specifically disclosed. Also, as illustrated, the air bag assembly 20 is located at an outboard lateral side or extremity of the seat to provide protection against adjacent vehicle structure. But it is also possible to have the side air bag assembly located at the inboard lateral side to provide protection against an adjacent vehicle occupant and to also have side air bag assemblies at both outboard and inboard locations for protection in both lateral directions.

Referring now to FIGS. 2-3, the air bag assembly 20 includes an air bag and an inflator (not shown). The assembly 20 is configured to supply an inflation fluid such as gas to the air bag, thereby facilitating its deployment. In at least one embodiment, the air bag assembly 20 also includes a housing 40 which at least partially surrounds the air bag and the inflator. In most embodiments, the housing 40 includes a container 46 secured to the seat frame 26 and a lid 48 that may open like a clam shell away from the container 46. It should be appreciated that neither the container 46 nor the lid 48 of the housing 40 need be formed from a rigid material. In some applications, in alternate embodiments, the container 46 and/or the lid 48 may be formed from a relatively soft material such as a woven or non-woven textile or a plastic sheet. In such cases, when the air bag is inflated, the forces of deployment will be exerted upon the spinnaker-shaped reinforcement panel 56. One consequence is that as the air bag travels outwardly beneath the trim cover 18, a sharp inwardly directed pull will be exerted upon and will lacerate the release seam 28.

Also shown in FIG. 2 is a portion of the seat frame 26 which can be used for mounting the seat assembly 10 to a vehicle. The seat pad 16 is disposed proximate the frame 26 and the air bag assembly 20 and may be directly attached to the frame 26 at various points. An edge of the trim cover 18 forms part of an air bag release seam 28 (FIGS. 2-7) which in at least one embodiment is proximate to a side 33 of the seat pad 16.

In the embodiments shown in FIGS. 2-3, the trim cover 18 includes end portions 31, 33 that cooperate to form seam 28. Preferably, the end portions 31, 33 have one or more suitable connections or braces, shown schematically as stitching with ends 56 and 58, that cooperate to secure folded trim cover edges (shaped in some embodiments as knuckles) that comprise the seam 28. As also shown in the embodiment illustrated in FIG. 3, the ends 31 and 33 of cover 18 are connected to each other at seam 28 via any suitable connection member, such as stitching or thread or frangible staples or braces 60 that are shown schematically to help maintain seam 28 in a closed position before air bag deployment. While stitching 60 is shown schematically in FIGS. 2-7, it should be understood that other connection members or materials such as a breakable plastic, nylon, or fabric stitch or thread could be used.

The air bag assembly 20 is preferably located within the trim cover 18 and may be conventionally mounted, such as on the frame 26 in a spaced relationship from the release seam 28. The folded air bag, upon deployment, is inflated by inflation fluid from the inflator to unfold and project outwardly from the seat 10, ultimately through the air bag release seam 28 of the trim cover 18.

With continuing reference to FIGS. 1-3, a spinnaker-shaped reinforcement panel 56 is made of any suitable relatively inelastic material. The spinnaker-shaped reinforcement panel 56 has an anchored edge portion 52 that in some embodiments (FIG. 2) is secured to a seam 49 at the side or rear of the seat. Alternatively (FIG. 3), the anchored edge portion 52 is secured to the frame 26 by a suitable means, such as one or more J-clips 47. Extending from the anchored edge 52, in one embodiment, the reinforcement panel passes along the outboard side of the housing 40. A layer of foam in some embodiments may lie between the panel 56 and the container 40.

As the air bag deploys, the lid 48 of the housing 40 opens and moves outwardly to the left, with reference to the cross-sectional views depicted in FIGS. 2-3. A tensile force is then exerted upon the spinnaker-shaped reinforcement panel 56. Its longer, anchored edge 52 is firmly attached, as discussed above. Since the panel 56 is relatively inelastic, the forces of airbag deployment and opening of the clamshell-shaped housing 48 are communicated to the leading or pointed end 49 of the panel. That end is subjected to a sharp, inwardly directed tugging force. Since pressure equals force divided by area and the denominator at the leading nose 49 is relatively small, the pressure exerted upon the seam 28 that is secured to the panel is concentrated and augmented. Localized rupturing then occurs in the release seam 28. That localized rupture is propagated along the seam away from the small area at which the nose 49 of the panel 56 is attached.

As noted above, when the air bag 22 deploys, the lid 48 moves outwardly, like a clam shell. The container 46 part of the housing 40 is immobilized by its attachment via a bolt or fastener (not shown) to the seat frame 26. Outward movement of the clam shell lid 48 urges the panel (in relation to the frame of reference of FIGS. 2-3) to the left, or outwardly in relation to the center of the seat assembly. This action causes tension in the spinnaker-shaped reinforcement panel 56. Since the anchored edge 52 of the spinnaker-shaped reinforcement panel 56 is immobilized, the tension induced in the spinnaker-shaped reinforcement panel 56 produces a sharp, localized, inwardly directed pull at the tear seam 28. Upon deployment of the air bag, the spinnaker-shaped reinforcement panel 56 will lacerate the release seam 28, thereby facilitating the bag's egress. Thus, the air bag can extend through the release seam 28 and outside the seat assembly 10 into an occupant protection position.

Optionally, the reinforcement panel 56 may comprise woven or non-woven cloth material, which may include natural or synthetic materials such as nylon. One material that is found to be effective is a polyester material, of the type from which the air bag may be manufactured. Regardless of the type of material used, the panel 56 can be helpful in reducing friction on the air bag as it deploys. Although a polymer such as nylon may be particularly beneficial, even a fleece material will help reduce the friction on the air bag. This is because the panel 56 inhibits contact between the deploying air bag 22 and the trim cover 18.

This, in turn can also help to reduce the deployment time for the air bag and/or the amount of inflation fluid required to deploy the air bag.

The spinnaker-shaped reinforcement panel 56 can be made by any suitable process and of any suitable material such as nylon, PP, and PE. In at least one embodiment, it is made of a somewhat bendable material such as a wire or band. In alternative embodiments, a portion of the spinnaker-shaped reinforcement panel 56 may comprise a string, band, wire, textile, mesh, tab, or a strap.

If the seam 28 is formed from continuous stitching that extends along its length, the nose 49 of the spinnaker-shaped reinforcement panel 56 may only be connected to one or more threads of the stitching, since breaking one thread in a continuous stitching will allow the stitching to unravel, thereby allowing seam 28 to open.

In at least one embodiment, the spinnaker-shaped reinforcement panel 56 has a length of 30 to 100 cm (centimeters), in other embodiments of 60 to 100 cm, and in yet other embodiments of 60 to 90 cm. In some embodiments, the spinnaker-shaped reinforcement panel 56 has an average thickness of 0.01 to 5 mm (millimeters), in other embodiments of 0.05 to 4 mm, and in yet other embodiments of 0.2 to 2.0 mm.

Figure 4:
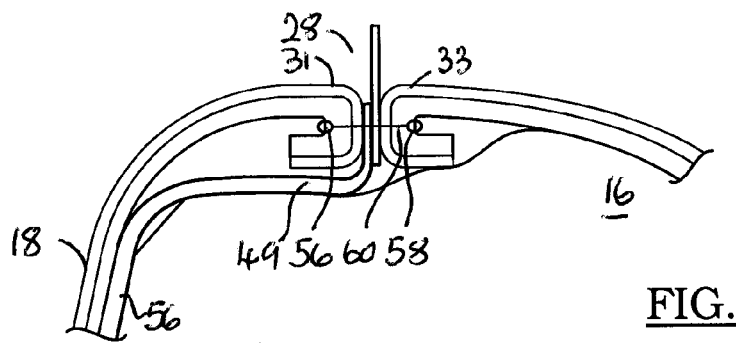
FIGS. 4-7 are fragmentary sectional views of alternative ways to affix a leading nose portion of a spinnaker-shaped reinforcement panel to a release seam.
Figure 5:
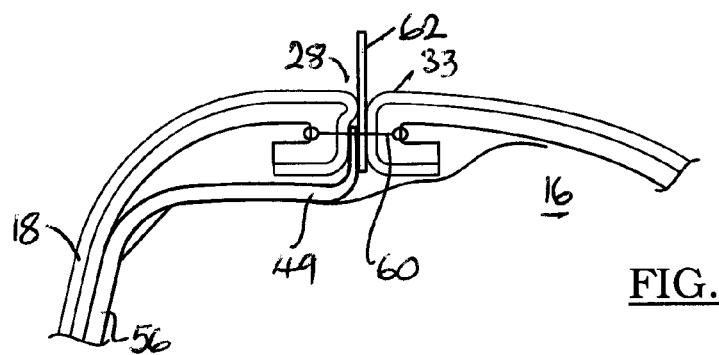

Turning now to FIGS. 4-7, it will be appreciated that FIG. 4 depicts an embodiment wherein the release seam 28 includes a brace 60 that releasably attaches respective facing knuckle portions of folded over ends of a side and a front trim cover. In FIG. 5, the nose portion 49 is secured on an inside of the knuckle portion of the side trim cover 18. A label member 62 is also secured between the knuckle portion of the front and side trim covers. In that embodiment, the label member 62 protrudes outside the trim covers and release seam 28. Optionally (FIG. 7), the leading nose portion 49 of the reinforcement panel 56 itself serves as a label member 62.

Figure 6:
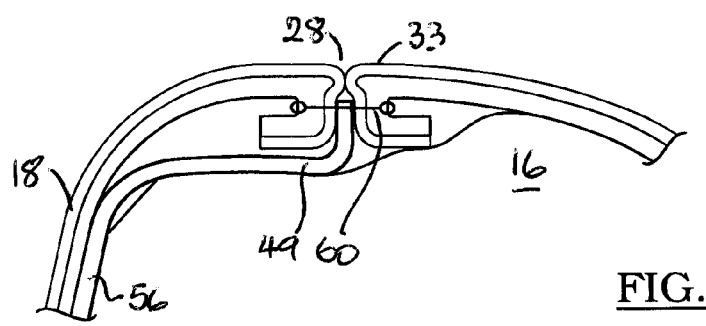
Figure 7:
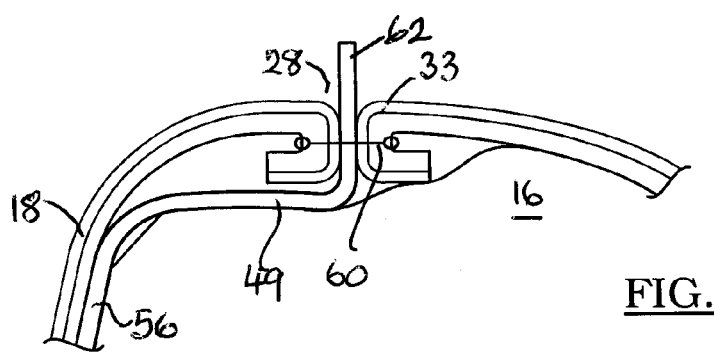

An alternative embodiment is shown in FIG. 6. In that figure, the nose portion 49 is secured between the knuckle portions of the side and front trim cover so that it is invisible when viewed from the outside of the side and front trim covers.

It will be appreciated that in other embodiments, the seat assembly may include multiple spinnaker-shaped reinforcement panels, such as the panel 56. In such embodiments, the leading nose portion 49 will be secured at various locations along the release seam 28.

As required, detailed embodiments of the present invention are disclosed herein. However, it is to be understood that the disclosed embodiments are merely exemplary of the invention that may be embodied in various alternative forms. The figures are not necessarily to scale. Some features may be exaggerated or minimized to show details of particular components. Therefore the specific structural and functional details disclosed herein are not to be interpreted as limiting, but merely as a representative basis for the claims and/or a representative basis for teaching one skilled in the art how to variously employ the present invention.

Moreover, except where otherwise expressly indicated, all numerical quantities in this description and in the claims indicating amounts of materials or conditions of reactions and/or use are to be understood as modified by the word "about" in describing the broader scope of this invention. Practice within the numerical limits stated is generally preferred. Also, unless expressly stated to the contrary, the description of a group or class of materials as suitable or preferred for a given purpose in connection with the invention implies that mixtures of any two or more members of the group or class may be equally suitable or preferred.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly with a frame, a trim cover extending at least partially over a seat pad and including a first and a second end portion to form a release seam, a brace extending between the first and second end portions of the trim cover at the release seam to maintain the release seam in a closed position before air bag deployment, an air bag assembly at least partially within the trim cover, the air bag assembly being in a spaced relationship from the air bag release seam, the air bag assembly housing an inflator and an air bag that is inflated by the inflator to unfold and project outwardly from the seat through the air bag release seam when the air bag seam is at least partially ruptured, the vehicle seat assembly comprising:
   a spinnaker-shaped reinforcement panel with an anchored edge portion secured to the frame and a leading nose portion attached to the release seam, the spinnaker-shaped reinforcement panel passing at least partially around a side of the air bag assembly, and around a padded region positioned adjacent to a side of the air bag assembly,
   the leading nose portion of the spinnaker-shaped reinforcement panel being movable in response to inflation of the air bag with sufficient force to rupture the release seam, thereby opening the release seam and allowing the air bag to pass therethrough.

2. The vehicle seat assembly of claim 1, wherein the spinnaker-shaped reinforcement panel passes between the air bag assembly and the trim cover.

3. The vehicle seat assembly of claim 1, wherein the brace releasably attaches respective facing knuckle portions of folded over ends of a side and a front trim cover.

4. The vehicle seat assembly of claim 3, wherein the leading nose portion is secured on an inside of the knuckle portion of the side trim cover.

5. The vehicle seat assembly of claim 3, wherein the nose portion is secured between the knuckle portions of the side and front trim cover.

6. The vehicle seat assembly of claim 3, wherein the nose portion is secured between the knuckle portions of the side and front trim cover so that the panel is invisible from outside the trim covers.

7. The vehicle seat assembly of claim 3, further including a label member, wherein the nose portion and the label member are secured between the knuckle portions of the side and front trim cover.

8. The vehicle seat assembly of claim 3, further including a label member, wherein the label member extends from the nose portion and the nose portion and the label member are secured between the knuckle portions of the side and front trim cover.

9. The vehicle seat assembly of claim 1, wherein the brace is selected from the group consisting of continuous stitching, intermittent stitching, a plastic staple, ultrasonic welding and a glue.

10. The vehicle seat assembly of claim 1, wherein the spinnaker-shaped reinforcement panel comprises a member selected from the group consisting of a strap, a plastic, an array of wires, an assembly of chords, a textile and combinations thereof.

11. The vehicle seat assembly of claim 1 in which there are multiple spinnaker-shaped reinforcement panels.

12. The vehicle seat assembly of claim 1, wherein the spinnaker-shaped reinforcement panel has an anchored edge that is secured to the frame.

13. The vehicle seat assembly of claim 1, wherein the spinnaker-shaped reinforcement panel has an anchored edge that is secured to a trim cover.

14. In a vehicle seat assembly having a seat pad associated with a frame, a trim cover extending over the seat pad and including a release seam, an air bag assembly at least partially within the trim cover, the air bag assembly being provided with a container and a lid, the container being secured to the frame so that the air bag assembly lies in a spaced relationship from the release seam, the air bag assembly housing an inflator and a folded air bag that is inflated to unfold and project outwardly from the seat through the air bag release seam when the air bag seam is in an opened position, a spinnaker-shaped reinforcement panel extending between the frame and the release seam, the spinnaker-shaped reinforcement panel passing around a side of the air bag assembly, the spinnaker-shaped reinforcement panel having a leading nose detachably attached to the release seam and an anchored edge secured to the frame, the leading nose being movable in response to inflation of the air bag with sufficient force to lacerate the release seam, thereby allowing the release seam to open and allow the air bag to pass therethrough,
   a method for deploying the air bag, comprising the steps of:
   inflating the air bag;
   tensioning the spinnaker-shaped reinforcement panel by outwardly directed forces of air bag deployment acting upon the panel; and
   lacerating the release seam by a sharp, inwardly directed tug exerted upon the release seam by tensioning forces applied to the spinnaker-shaped reinforcement panel.

15. A vehicle seat assembly with a frame, a trim cover extending at least partially over a seat pad and including a first and a second end portion to form a release seam, a brace extending between the first and second end portions of the trim cover at the release seam to maintain the release seam in a closed position before air bag deployment, an air bag assembly at least partially within the trim cover, the air bag assembly being in a spaced relationship from the air bag release seam, the air bag assembly housing an inflator and an air bag that is inflated by the inflator to unfold and project outwardly from the seat through the air bag release seam when the air bag seam is at least partially ruptured, the vehicle seat assembly comprising:

a spinnaker-shaped reinforcement panel with an anchored edge portion secured to the frame and a leading nose portion attached to the release seam, the spinnaker-shaped reinforcement panel passing at least partially around a side of the air bag assembly, and around a padded region positioned adjacent to a side of the air bag assembly, the leading nose portion of the spinnaker-shaped reinforcement panel being movable in response to inflation of the air bag with sufficient force to rupture the release seam, thereby opening the release seam and allowing the air bag to pass therethrough, wherein the brace releasably attaches respective facing knuckle portions of folded over ends of a side and a front trim cover; and a label member, the nose portion and the label member being secured to the release seam.

16. The vehicle seat assembly of claim 15, wherein the nose portion and the label member are secured between the knuckle portions of the side and front trim cover.

17. The vehicle seat assembly of claim 15, wherein the label member extends from the nose portion and the nose portion and the label member are secured between the knuckle portions of the side and front trim cover.

* * * * *